United States Patent [19]

Hayashi et al.

[11] 4,315,563
[45] Feb. 16, 1982

[54] DISC BRAKE FOR PREVENTING SQUEAK NOISE

[75] Inventors: Hideyuki Hayashi, Mishima; Shigeru Okuma, Susono, both of Japan

[73] Assignee: Toyota Jidosha Kogyo Kabushiki Kaisha, Toyota, Japan

[21] Appl. No.: 46,193

[22] Filed: Jun. 6, 1979

Related U.S. Application Data

[63] Continuation of Ser. No. 873,860, Jan. 31, 1978, abandoned, which is a continuation of Ser. No. 723,953, Sep. 16, 1976, abandoned.

[30] Foreign Application Priority Data

Jan. 19, 1976 [JP] Japan .............................. 51-03414[U]

[51] Int. Cl.³ .............................................. F16D 65/40
[52] U.S. Cl. .................................. 188/73.1; 188/73.38; 188/250 G
[58] Field of Search .................... 188/73.3, 73.4, 73.5, 188/73.6, 73.1, 71.1, 73.2, 250 B, 24, 250 G, 251, 218

[56] References Cited

U.S. PATENT DOCUMENTS

| 2,599,826 | 6/1952 | Halstead et al. ........... 188/251 A X |
| 3,365,041 | 1/1968 | Stormfeltz .................. 188/251 A X |
| 3,625,314 | 12/1971 | Rinker ............................ 188/73.5 X |
| 3,899,050 | 8/1975 | Savary et al. ...................... 188/73.1 |

FOREIGN PATENT DOCUMENTS

| 1480125 | 7/1969 | Fed. Rep. of Germany ..... 188/71.1 |
| 1934509 | 1/1971 | Fed. Rep. of Germany ..... 188/71.1 |
| 1936180 | 1/1971 | Fed. Rep. of Germany ..... 188/71.1 |
| 1089955 | 11/1967 | United Kingdom ............... 188/73.1 |
| 1244599 | 9/1971 | United Kingdom ............... 188/71.1 |

Primary Examiner—Douglas C. Butler

[57] ABSTRACT

In order to suppress squeak noise generated at the time of braking of a disc brake, there is provided a member for removing abrasion powder as well as a conventional pair of friction pads which are provided on both sides of the disc. The member is designed so as to remove abrasion powder adhering to the disc at the time of engagement of the disc with the friction pads.

5 Claims, 6 Drawing Figures

ROTORS TURNING DIRECTION

DISC BRAKE FOR PREVENTING SQUEAK NOISE

This is a continuation of application Ser. No. 873,860, filed Jan. 31, 1978, which is a continuation of Ser. No. 723,953, filed Sept. 16, 1976, both of which are now abandoned.

BACKGROUND OF THE INVENTION

Field of the Invention

The present invention relates to means for preventing squeak in a disc brake and more specifically to removing an abrasion powder formed during the braking action.

SUMMARY OF THE INVENTION

The inventors of the present invention have found that the abrasion powder of a brake adhering to a disc brack rotor at the time of applying the brake constitutes the main cause of a series of such irregularities as (I) Deterioration of the braking effect of a brake (II) Generation of a low-frequency noise at the time of applying a brake (III) Generation of chatter and vibration of the body of a vehicle, and (IV) Generation of a high-frequency noise (conventionally called a brake squeak)

Now, the purpose of the present invention is to provide a new and novel disc brake for preventing a squeak from being generated at the time of applying a brake and the present invention is specifically intended to cause the disc which is made of heat-resistant material, including glass fiber, asbestos, or the like, to be properly engaged with a disc rotor either at all times or at the time of applying the brake for the purpose of removing an abrasion powder adhering to the disc brake rotor. To put it otherwise, the subject matter of the present device resides in moving such a disc brake device specifically designed for preventing a squeak from being generated and features a disc brake that is provided with a disc that is capable of being put in rotation, a pair of friction-pads arranged in place on the both sides of the said disc and properly engaged with the said disc for braking, and a member that is specifically designed for removing an abrasion powder adhering to the disc at the time of the engagement of the said friction-pads with the said disc.

Other pruposes and the effects of the present invention will be self-evident in view of an illustration of the present invention whereof a detailed description is given below by making reference to the drawings attached hereto.

DETAILED DESCRIPTION OF THE INVENTION

Figure 1:
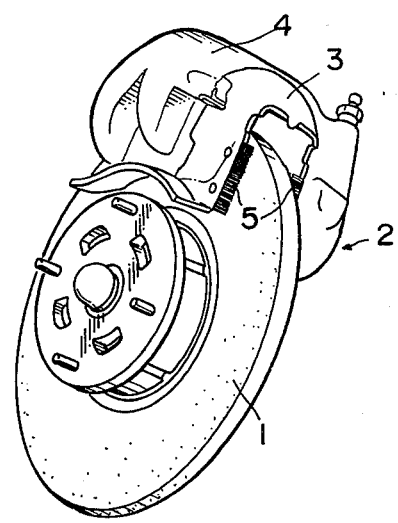
FIG. 1 is a perspective of the disc brake of the present device.
Figure 2:
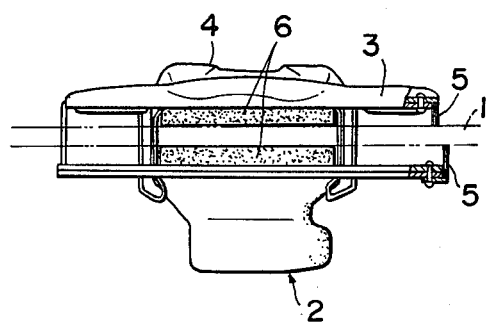
FIG. 2 is a drawing of the disc brake projected on the plane parallel to the rotating shaft of the disc rotor shown in FIG. 1.

FIG. 1 is a perspective of the present device, and FIG. 2 is a drawing of a disc brake 2 projected on a plane parallel to the rotating shaft of a disc rotor 1 shown in FIG. 1. A caliper 4 is mounted on a vehicle and supports a pair of friction pad assemblies which are so arranged in place as to be engaged slidably by both surfaces of the disc rotor 1 confronted with the axial direction thereof. Furthermore, the said mounting 3 has an abrasion powder removing member 5 that is engaged with the both surfaces of disc rotor 1 and is specifically designed so as to remove the abrasion powder generated by the frictional engagement of the disc rotor 1 with a friction pad at the time of applying the brake properly fixed in place thereon. The said removing member 5 is kept engaged with the disc rotor 1 at all times; therefore, the said removing member 5 is given a fibrous shape, and glass fiber, a wire brush, or the like is selected for use as such.

The said abrasion powder removing member 5 is recommended to be made of such material as features a high level of heat resistance, since the temperature of the disc rotor 1 rises as high as 400°–500° C., and, in this case, the said abrasion powder removing member 5 is required to be made of a material featuring a high level of abrasion resistance, since the said abrasion powder removing member 5 is kept engaged with the disc rotor 1 at all times.

Figure 3:
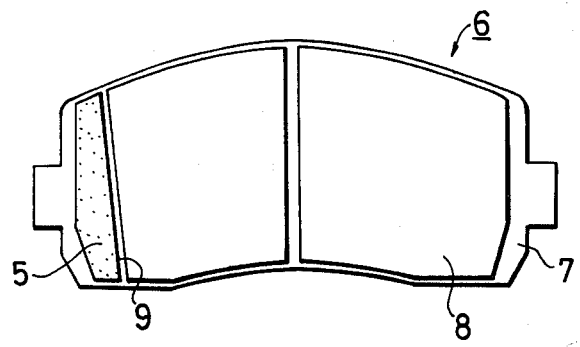
FIG. 3 is a front view of the second embodiment.
Figure 4:
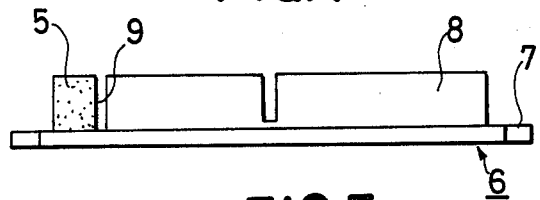
FIG. 4 is a plan of what is shown in FIG. 3.

FIG. 3 is a front view of the second embodiment of the present device, and FIG. 4 is a plan of the illustration shown in FIG. 3. The disc brake shown is one that is supported by a caliper 4, that comes in frictional engagement with the disc rotor 1 at the time of braking. A part of a friction-pad 6 assembly performing the braking function has an abrasion powder removing member, made of such material as is capable of removing abrasion powder, properly set in place thereon. To put it otherwise, the friction-pad 6 has a pad assembly lining 8 fixed thereon supported by a metal lining 7, the said pad lining 8 containing resin, powdered metal, dust rubber and the like, which are formed into abrasion powder and adhere to the disc rotor 1. The abrasion powder removing member 5 specifically designed for removing the said abrasion powder is properly fixed in place on the side of the said metal lining 7 and is spaced from said pad lining 8 by a groove 9.

The abrasion powder removing member 5 is made of, for instance, asbestos, glass fiber, or the like, and is recommended to have a high level of heat resistance, as set forth above. And, the degree of the abrasion thereof is recommended to be the same as, or less in abrasion resistance than that of the pad lining 8.

Figure 5:
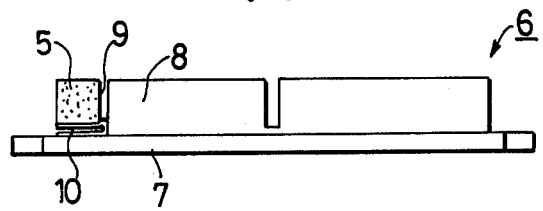
FIG. 5 is a plan of the illustration shown in FIG. 3.

Shown FIG. 5 is the third embodiment of the present device, wherein the abrasion powder removing member 5 is fitted on a metal lining 7 with a spring 10 interposed in between. In this case, deflected abrasion taking shape in the pad lining 8 causes the abrasion powder removing member 5 to be subjected to deflected abrasion only by a negligible degree, if any, since the abrasion powder removing member 5 is biased by a spring of weak elasticity, and, at the time of braking, the abrasion powder can thus be removed in a more favorable manner, since the abrasion powder removing member 5 is caused to be properly kept in contact with the disc rotor at all times.

It goes without saying that the present device can be applied for proper removal of abrasion powder from the lining not only of the disc brake disclosed herein but also of a drum brake likewise.

Figure 6:
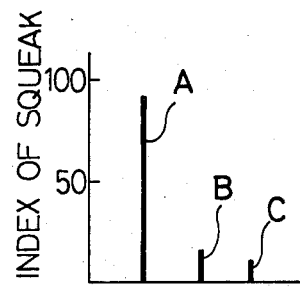
FIG. 6 is a graph prepared for making a comparison of the pad provided by the present device with a conventional pad in terms of the index of a squeak.

Shown in FIG. 6 is a result of the series of experiments conducted for the purpose of displaying the effect of the present device, and shown in this graph is a comparison of a pad having the abrasion powder removing member introduced in the present device fitted in place thereon with a conventional pad, by putting together the frequency of generation of a squeak and the noise level of the squeak, then expressed in terms of an index of the squeak. A represents a conventional pad fitted with no abrasion powder removing member, B represents a pad employing asbestos as the abrasion powder removing member introduced in the present device, and C represents a pad employing glass fiber as the abrasion powder removing member introduced in the present device.

As elucidated in the preceding paragraphs, it is clear and evident that the disc brake fitted with the pad abrasion powder removing member introduced in the present device proves, when compared with a conventional one, to be well capable of eliminating and solving the above-mentioned irregularities involved in the conventional one, and considerably effective in coping with the squeak of a brake among others.

Having described certain embodiments of this invention in detail, it is to be understood that the same have been offered by way of example and that this invention is only to be limited by the scope of the following claims.

What is claimed is:

1. In a disc brake assembly including a substantially flat, rotatable disc having two oppositely facing flat side surfaces, two substantially flat friction pad assemblies each facing a respective one of said flat side surfaces of said disc and adapted to frictionally engage the flat side surfaces of said disc and means for urging said friction pad assemblies against said flat side surfaces of said disc, the improvement wherein said friction pad assemblies comprise a pair of spacedly opposed metal linings each one of which has an enlarged mounting surface bounded by a periphery, each said mounting surface being positioned in spaced opposition to one of said flat side surfaces of said disc, pad lining means secured to said enlarge mounting surface of each said metal lining completely within the periphery thereof and in contactable opposition to said flat side surfaces of said disc, said pad lining means including an elongated side edge positioned substantially radially with respect to the rotational axis of said disc and a dust removal member rigidly mounted directly on each said metal lining on the same mounting surface thereof as said pad lining means whereby said pad lining means and said dust removal members have contiguous surfaces in contact with said flat side surfaces of said disc, each said dust removal member being contained completely within and proximate a portion of the periphery of said metal linings, said dust removal member having a wear resistance equal to or less than that of said pad lining means and being completely supported by said mounting surface of said respective metal lining, each said dust removal member including an elongated, substantially radially oriented side edge located adjacent said side edge of said pad lining means and in spaced relation therewith so as to define a substantially radially arranged, elongated space therebetween, whereby dust is removed by said removal members from said flat side surfaces of said disc as long as said pad lining means of said friction pad assemblies engage said flat side surfaces of said disc as said disc rotates.

2. The improvement according to claim 1 wherein said dust removal members are made of asbestos.

3. The improvement according to claim 1 wherein said dust removal members are made of a fibrous material.

4. The improvement according to claim 3 wherein said fibrous material is glass fiber.

5. The improvement according to claim 3 wherein said fibrous material is wire.

* * * * *